Goodrich & Amos.
Making Clay Pipes.
N° 74078. Patented Feb. 4, 1868.
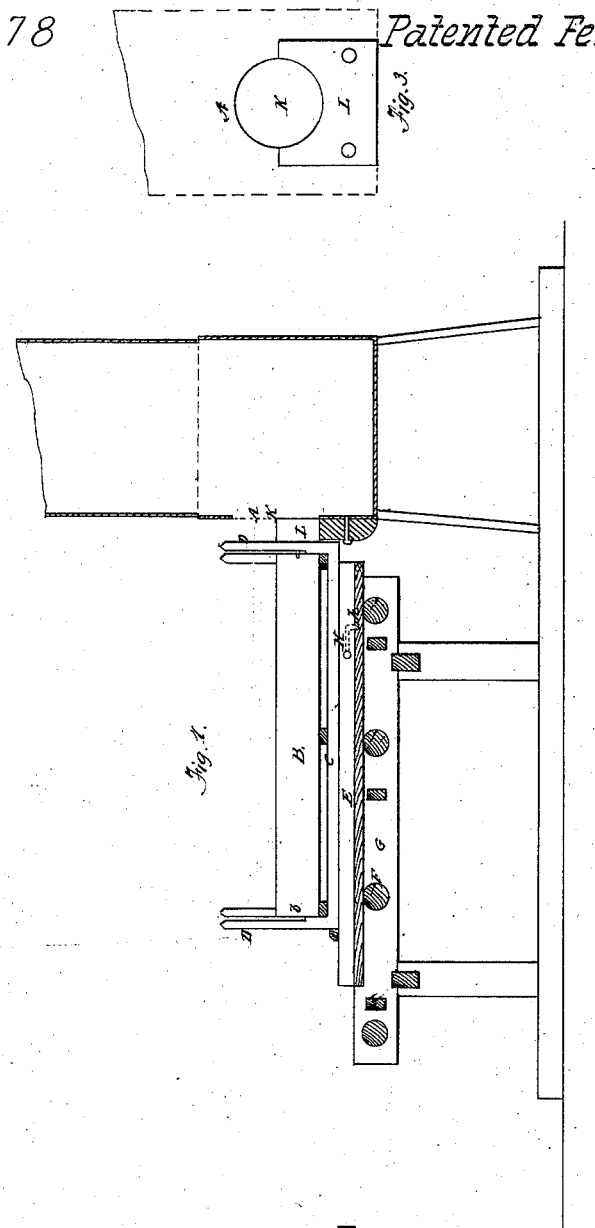

H. A. GOODRICH AND JOSEPH AMOS, OF JOLIET, ILLINOIS.

Letters Patent No. 74,078, dated February 4, 1868.

---

IMPROVEMENTS IN THE MANUFACTURE OF CLAY PIPES.

---

The Schedule referred to in these Letters Patent and making part of the same.

---

TO ALL WHOM IT MAY CONCERN:

Be it known that we, H. A. GOODRICH and JOSEPH AMOS, of the town of Joliet, in the county of Will, and State of Illinois, have invented new and useful Improvements in the Manufacture of Clay Pipes; and we do hereby declare that the following is a full and exact description thereof, reference being had to the accompanying drawings, making part of this specification, in which—

Figure 1 represents the longitudinal section of the trough and its carriage, and of the mouth-piece.

Figure 2 represents the back view of the trough and its carriage, and

Figure 3 represents the front view of the mouth-piece.

The nature of our invention consists, first, in the use of a metallic trough, or a trough made of some other material, but lined with metal, put on a movable frame, and used in the manufacture of clay pipes, by and in connection with a machine, from which the pipes are forced continuously, and cut off at any required length, without stopping the machine to perform that operation; second, it consists also in the use of a mouth-piece, put in front of the orifice, through which the pipes are forced out of the die.

To enable others skilled in the art to make and use our invention, we will describe its construction and operation.

The machine itself may be constructed in any of the known forms used for the manufacture of clay pipes continuously, viz, without stopping in its operation in order to cut off the pipes of the required length while they are forced out of the die.

The device to cut off the pipes consists in a trough, B, put on a frame, C, to which standards, D D, for the cutters are attached. The whole is placed on the carriage E, that has a strip, c, to keep the trough in its place, the carriage itself being placed upon the rollers F F of the frame G, belonging to the machine. There is a hook or catch, H, attached to the carriage E, that may enter a notch or a loop, h, of the upper part of the frame G, and prevent the carriage from moving back with the pipe as this is pressed out of the die A.

To make the troughs B smooth and durable, we make them of metal; or, if made of wood or other material, we line them with metal, the advantage being that the clay pipe slides easily on a smooth metallic surface, kept wet during the operation, and does not receive any abrasions. The length of the troughs is regulated by the length of the pipes to be made, and their depth may be equal to half the diameter of the pipe, or less.

In order to support and to guide the pipe at the time of its coming out of the orifice K of the die, and before its entering upon the trough B, we place in front of that orifice the mouth-piece L, which may be made of metal or any other suitable material, and may be made to extend partly or entirely around the orifice K, and also it may be made separately from the machine, and fastened at and under the orifice, or made in one piece with the die A.

The advantage of having the mouth-piece L consists in this, that, when the forward end of the pipe reaches the end b of the trough, and the pipe is cut at a, the trough, with the pipe, is taken away, and another one substituted in its place, before the following pipe, pressed out of the die, supported and guided by the mouth-piece L, extends too far from the mouth-piece to hinder the placing of a new trough in position to receive it.

The operation consists in the following: The carriage E being hooked to the frame G, the pipe, being pressed out of the die A, and guided and supported by the mouth-piece L, passes along the trough B until its forward end reaches the end, b, of the trough, when a workman unhooks the carriage. The carriage then is carried backward with the trough with and at the same motion of the pipe continuously pressing out of the die, when another workman cuts off the pipe at the point a. Then the trough, with the piece of pipe on it, is taken away, and another empty one is substituted in its place, and the operation is continued.

We do not claim the invention or use of wooden troughs in the manufacture of clay pipes, believing the same to be an old invention; but What we do claim as our invention, and desire to secure by Letters Patent, is—

The combination of the stationary mouth-piece L, the trough B, and carriage G, all arranged to operate as shown and described.

H. A. GOODRICH,
JOS. AMOS.

Witnesses:
J. H. HANSON,
C. KERNES.